United States Patent
Wang

(10) Patent No.: US 9,448,821 B2
(45) Date of Patent: Sep. 20, 2016

(54) METHOD AND SYSTEM FOR REALIZING VIRTUAL MACHINE MOBILITY

(75) Inventor: Jun Wang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 523 days.

(21) Appl. No.: 13/880,418

(22) PCT Filed: Aug. 19, 2011

(86) PCT No.: PCT/CN2011/078646
§ 371 (c)(1),
(2), (4) Date: Apr. 19, 2013

(87) PCT Pub. No.: WO2012/051884
PCT Pub. Date: Apr. 26, 2012

(65) Prior Publication Data
US 2013/0232492 A1 Sep. 5, 2013

(30) Foreign Application Priority Data
Oct. 19, 2010 (CN) .......................... 2010 1 0517376

(51) Int. Cl.
*G06F 9/455* (2006.01)
*H04L 29/12* (2006.01)
*G06F 9/48* (2006.01)

(52) U.S. Cl.
CPC ........... *G06F 9/455* (2013.01); *G06F 9/45558* (2013.01); *G06F 9/4856* (2013.01); *H04L 61/103* (2013.01); *H04L 61/2084* (2013.01); *G06F 2009/4557* (2013.01)

(58) Field of Classification Search
None
See application file for complete search history.

(56) References Cited

U.S. PATENT DOCUMENTS

| 7,492,787 B2* | 2/2009 | Ji et al. .......................... 370/466 |
| 8,214,537 B2 | 7/2012 | Miura |
| 8,532,116 B2* | 9/2013 | Portolani et al. ........ 370/395.53 |
| 2008/0288654 A1 | 11/2008 | Matuszewski et al. |

FOREIGN PATENT DOCUMENTS

| CN | 101682618 A | 3/2010 |
| CN | 101686160 A | 3/2010 |
| WO | 2007086578 A1 | 8/2007 |

OTHER PUBLICATIONS

PCT International Search Report Dated Nov. 24, 2011, Application No. PCT/CN2011/078646, 5 Pages.

* cited by examiner

*Primary Examiner* — Mengyao Zhe
(74) *Attorney, Agent, or Firm* — Brooks Kushman P.C.

(57) ABSTRACT

The present document discloses a method and system for realizing virtual machine mobility, comprising: in a process of establishing communication with a second virtual machine, a first virtual machine subscribing to a media access control (MAC) address change notification of the second virtual machine from an address resolution server (ARS) through a first virtual switch in a physical server where the first virtual machine is located; after the second virtual machine migrates, a second virtual switch in a physical server, to which the second virtual machine migrates, registering a corresponding relationship between an IP address of the second virtual machine and a MAC address of the second virtual switch itself to the ARS; and the ARS updating the MAC address corresponding to the IP address of the second virtual machine, and notifying the first virtual machine of the updated MAC address according to the subscription of the first virtual machine.

13 Claims, 3 Drawing Sheets

METHOD AND SYSTEM FOR REALIZING VIRTUAL MACHINE MOBILITY

CROSS-REFERENCE TO RELATED APPLICATIONS

This application is a U.S. national phase of PCT Application No. PCT/CN2011/078646 filed Aug. 19, 2011 which claims priority to Chinese Application No. 20100517376.1 filed Oct. 19, 2010, the disclosures of which are incorporated in their entirety by reference herein.

TECHNICAL FIELD

The present document relates to a layer-2 network, and in particular to a method and system for realizing virtual machine mobility.

BACKGROUND ART

In the current IP local area network, an address of a layer-2 network is obtained by adopting an ARP (Address Resolution Protocol) in IPV4 and adopting a NDP (Neighbor Discovery Protocol) in IPV6. Mechanisms for address discovery are substantially identical for both the ARP and the NDP, i.e., both the ARP and the NDP obtain a data link layer address corresponding to a destination IP address by means of layer-2 broadcasting. For an Ethernet, the data link layer address corresponds to a MAC (Media Access Control) address. Each host maintains a standalone buffer, and presets aging timing time; and when sending an IP message, the host has to broadcast an ARP/NDP message in the local area network to query the data link layer address corresponding to the destination IP address if this destination IP address is not recorded in the local buffer of the host.

When there are a large number of hosts in the local area network, for example, a large-scale data center, or even a cross-region L2VPN (layer-2 virtual private network) connected using L2VPN technology, there may be thousands of or tens of thousands of hosts; and this situation may be worse when using the application of virtualization technology. With the virtualization technology, one physical host can support dozens of virtual hosts, and will be able to support up to hundreds of virtual hosts in the future. Each virtual host has its own IP address and MAC address. Although isolation of broadcast storm can be implemented using VLAN (virtual local area network) division (where VLAN includes port-based VLAN and MAC-based VLAN), both of the port-based VLAN and the MAC-based VLAN cannot be used since the virtual machine migration technology brought by virtualization technology requires the host itself, the IP address and the MAC address to be completely floatable.

A very important function in the virtualization technology is to achieve load balance and energy conservation and emission reduction using the virtual machine migration. The application scenes are as follows: 1) when services are busy, if load of a data center 1 is too high and is close to an overload threshold, while a data center 2 is still in a light load state, a virtual machine management center instructs a plurality of virtual machines in the data center 1 to migrate to a physical server in the data center 2, thereby reducing the load of the data center 1; 2) when services are not busy, all virtual machines on some physical servers are migrated to other physical servers with light load which may be within the same data center or may be at another data center site, and after migration, the physical centers from which the virtual machines are migrated are powered off, thereby achieving the function of energy conservation and emission reduction.

Under the existing technology system, since for the virtual machine migration the current state of service connection of the operation system needs to be kept, the IP and MAC addresses should remain unchanged after migration. However, since other hosts/virtual machines communicating with the migrated virtual machines have MAC buffers, the message forwarding relationship has actually changed after the virtual machines migrate across the sites, and these MAC buffers will cause communication interrupt; a layer-2 switch also needs to perform the MAC address learning again, and if the virtual machines migrate to the different port of the switch within the same site, the process of studying the MAC address again will also cause the communication interrupt.

SUMMARY OF THE INVENTION

The object of the present document is to provide a method and system for realizing virtual machine mobility so as to solve the problem of communication disconnection caused by virtual machine migration and achieve support for the virtual machine mobility.

In order to solve the above technical problem, a method for realizing virtual machine mobility of the present document comprises the following steps of:

in a process of establishing communication with a second virtual machine, a first virtual machine subscribing to a media access control (MAC) address change notification of the second virtual machine from an address resolution server (ARS) through a first virtual switch in a physical server where the first virtual machine is located;

after the second virtual machine migrates, a second virtual switch in a physical server, to which the second virtual machine migrates, registering to the ARS a corresponding relationship between an IP address of the second virtual machine and a MAC address of the second virtual switch; and the ARS updating the MAC address corresponding to the IP address of the second virtual machine, and notifying the first virtual machine of the updated MAC address according to the subscription of the first virtual machine.

The step of subscribing to a MAC address change notification of the second virtual machine from the ARS comprises: the first virtual machine sending an address resolution protocol (ARP) request to trigger the first virtual switch to query the MAC address corresponding to the IP address of the second virtual machine from the ARS, and meanwhile subscribing to the MAC address change notification of the second virtual machine from the ARS through the first virtual switch.

In the step of the first virtual machine sending an ARP request to trigger the first virtual switch to query the MAC address corresponding to the IP address of the second virtual machine from the ARS, and meanwhile subscribing to the MAC address change notification of the second virtual machine from the ARS through the first virtual switch, the first virtual machine queries the MAC address corresponding to the IP address of the second virtual machine from the ARS and subscribes to the MAC address change notification of the second virtual machine by adopting a request message.

The step of querying the MAC address corresponding to the IP address of the second virtual machine from the ARS and subscribing to the MAC address change notification of the second virtual machine by adopting a request message comprises:

the first virtual machine sending an address query broadcasting query request, the first virtual switch intercepting the address query broadcasting query request, converting the address query broadcasting query request to a unicast query & subscribe request, and using the unicast query & subscribe request to query the MAC address corresponding to the IP address of the second virtual machine from the ARS and subscribe to the MAC address change notification of the second virtual machine.

The step of notifying the first virtual machine of the updated MAC address comprises:

after updating the MAC address corresponding to the IP address of the second virtual machine, the ARS sending a notification message containing the updated MAC address, and the notification message firstly arriving at an access service router (ASR) to which the first virtual machine belongs; and if the updated MAC address is an address of the virtual switch under the ASR, the ASR notifying the first virtual switch of the updated MAC address.

The method further comprises the following steps of:

after subscribing to the MAC address change notification of the second virtual machine, the first virtual machine sending a message to the second virtual machine through the first virtual switch; and after receiving the message, the first virtual switch modifying a destination MAC address of the message to the received updated MAC address of the second virtual machine, and sending the message to the second virtual switch through a layer-2 switch.

The step of notifying the first virtual machine of the updated MAC address comprises:

after updating the MAC address corresponding to the IP address of the second virtual machine, the ARS sending a notification message containing the updated MAC address and an address of an ASR to which the second virtual machine belongs, and the notification message firstly arriving at an ASR to which the first virtual machine belongs; and if the updated MAC address is not an address of a virtual switch under the ASR to which the first virtual machine belongs, the ASR to which the first virtual machine belongs storing the updated MAC address and the address of the ASR to which the second virtual machine belongs, and notifying the first virtual switch of an address of the ASR itself to which the first virtual machine belongs.

The method further comprises the following steps of:

after subscribing to the MAC address change notification of the second virtual machine, the first virtual machine sending a message to the second virtual machine through the first virtual switch; and after receiving the message, the first virtual switch modifying a destination MAC address to the received address of the ASR to which the first virtual machine belongs, and sending the message to the ASR to which the first virtual machine belongs; and after receiving the message, the ASR to which the first virtual machine belongs modifying the destination MAC address to the updated MAC address of the second virtual machine, encapsulating the message in a tunnel and sending to the ASR to which the second virtual machine belongs, wherein an address of a header of the tunnel is the address of the ASR to which the second virtual machine belongs.

The method further comprises the following steps of:

after receiving the message, the ASR to which the second virtual machine belongs removing the tunnel, modifying a source MAC address of the message to a MAC address of the ASR itself to which the second virtual machine belongs, and sending the message to the second virtual switch according to the destination MAC address, and the second virtual switch querying the MAC address of the second virtual machine according to the destination IP address in the message, modifying the destination MAC address of the message to the MAC address of the second virtual machine, and sending the message to the second virtual machine.

The present document further provides a system for realizing virtual machine mobility, comprising: an operator network and a data center, wherein, a physical server in the data center installs with a virtual machine, the operator network is provided with an address resolution server (ARS), and the physical sever is further provided with a virtual switch, and wherein:

the virtual machine is configured to: in a process of establishing communication with an opposite end for communication, subscribe to a media access control (MAC) address change notification of the opposite end for communication from the ARS through the virtual switch;

the virtual switch is configured to: in the process of the virtual machine establishing the communication with the opposite end for communication, subscribe to the MAC address change notification of the opposite end for communication from the ARS; and when a virtual machine migrates into the physical server, register to the ARS a corresponding relationship between an IP address of the virtual machine that has migrated into and a MAC address of the virtual switch itself; and the ARS is configured to: when a virtual machine migrates, update a MAC address corresponding to an IP address of the virtual machine that has migrated, and notify the virtual machine subscribing to the MAC address change notification of the virtual machine that has migrated of the updated MAC address.

The virtual switch is configured to subscribe to the MAC address change notification of the opposite end for communication from the ARS in the following way: receiving an address query broadcasting query request sent by the virtual machine, convert the address query broadcasting query request to a unicast query & subscribe request, and use the unicast query & subscribe request to query the MAC address corresponding to the IP address of the opposite end for communication from the ARS and subscribe to the MAC address change notification of the opposite end for communication.

The data center further comprises an access service router (ASR); and wherein, the ARS is configured to notify the updated MAC address in the following way: sending a notification message containing the updated MAC address to the virtual machine subscribing to the MAC address change notification, and the notification message firstly arriving at the ASR to which the virtual machine subscribing to the MAC address change notification belongs;

the ASR is configured to: after receiving the updated MAC address of the opposite end for communication, if the updated MAC address of the opposite end for communication is an address of the virtual machine under this ASR, notify the virtual switch on the physical server of the updated MAC address.

The virtual machine is further configured to send a message to the opposite end for communication through the virtual switch;

the virtual switch is further configured to: after receiving the message, modify a destination MAC address of the message to the received updated MAC address of the opposite end for communication, and send the message to the virtual switch on the physical server where the opposite end for communication is located through a layer-2 switch.

The data center further comprises an ASR; wherein, the ARS is configured to notify the updated MAC address in the following way: sending a notification message containing the updated MAC address and an address of an ASR to which the virtual machine that has migrated belongs to the virtual machine subscribing to the MAC address change notification, and the notification message firstly arriving at an ASR to which the virtual machine subscribing to the MAC address change notification belongs;

the ASR is configured to: after receiving the updated MAC address of the opposite end for communication and the address of the ASR to which the opposite end for communication belongs, if the updated MAC address of the opposite end for communication is not the address of the virtual switch under this ASR, store the updated MAC address of the opposite end for communication and the address of the ASR to which the opposite end for communication belongs, and notify the virtual switch on the physical server of an address of this ASR itself.

The virtual machine is further configured to send a message to the opposite end for communication through the virtual switch;

the virtual switch is further configured to: after receiving the message, modify a destination MAC address to the received address of the ASR, and send the message to the ASR;

the ASR is further configured to: after receiving the message, modify the destination MAC address to the updated MAC address of the opposite end for communication, encapsulate the message in a tunnel and send to the ASR to which the opposite end for communication belongs, wherein an address of a header of the tunnel is an address of the ASR to which the opposite end for communication belongs.

The present document further provides a physical server, which is provided with a virtual switch and installs with a virtual machine, wherein, the virtual machine is configured to: in a process of establishing communication with an opposite end for communication, subscribe to a media access control (MAC) address change notification of the opposite end for communication from an address resolution server (ARS) through the virtual switch;

the virtual switch is configured to: in the process of the virtual machine establishing the communication with the opposite end for communication, subscribe to the MAC address change notification of the opposite end for communication from the ARS; and when a new virtual machine migrates into the physical server, register to the ARS a corresponding relationship between an IP address of the virtual machine that has migrated into and a MAC address of the virtual switch itself.

The virtual switch is configured to subscribe to the MAC address change notification of the opposite end for communication in the following way: receiving an address query broadcasting query request sent by the virtual machine, convert the address query broadcasting query request to a unicast query & subscribe request, and use the unicast query & subscribe request to query a MAC address corresponding to an IP address of the opposite end for communication from the ARS and subscribe to the MAC address change notification of the opposite end for communication.

The virtual machine is further configured to send a message to the opposite end for communication through the virtual switch;

the virtual switch is further configured to: after receiving the message, modify a destination MAC address to the updated MAC address of the opposite end for communication, and send the message to a virtual switch on a physical server where the opposite end for communication is located through a layer-2 switch, or after receiving the message, modify a destination MAC address to an address of an access service router (ASR) to which the virtual switch itself belongs, and send the message to an ASR to which the opposite end for communication belongs through the ASR to which the virtual switch itself belongs.

The present document further provides an address resolution server (ARS), which is configured to: update a MAC address corresponding to an IP address of a virtual machine that has migrated, and notify a virtual machine subscribing to a MAC address change notification of the virtual machine that has migrated of the updated MAC address.

The ARS is configured to notify the updated MAC address in the following way: sending a notification message containing the updated MAC address or containing the updated MAC address and an address of an ASR to which the virtual machine that has migrated belongs to the virtual machine subscribing to the MAC address change notification, and the notification message firstly arriving at an ASR to which the virtual machine subscribing to the MAC address change notification belongs.

With the present document, the virtual machine mobility can be supported in an extended L2 network without interrupted connection of upper-layer applications, thereby greatly improving the practicability of virtual machine migration.

PREFERRED EMBODIMENTS OF THE INVENTION

The problem of generating the broadcast storm in the process of a host obtaining a MAC address corresponding to a destination IP address can be solved by improving ARP/NDP. The technical solution of modifying a request with a way of ARP/NDP broadcasting to a request with a way of unicast can greatly reduce ARP/NDP broadcasting messages in the local area network, thereby increasing the upper limit of the scale of the L2 network.

Figure 1:
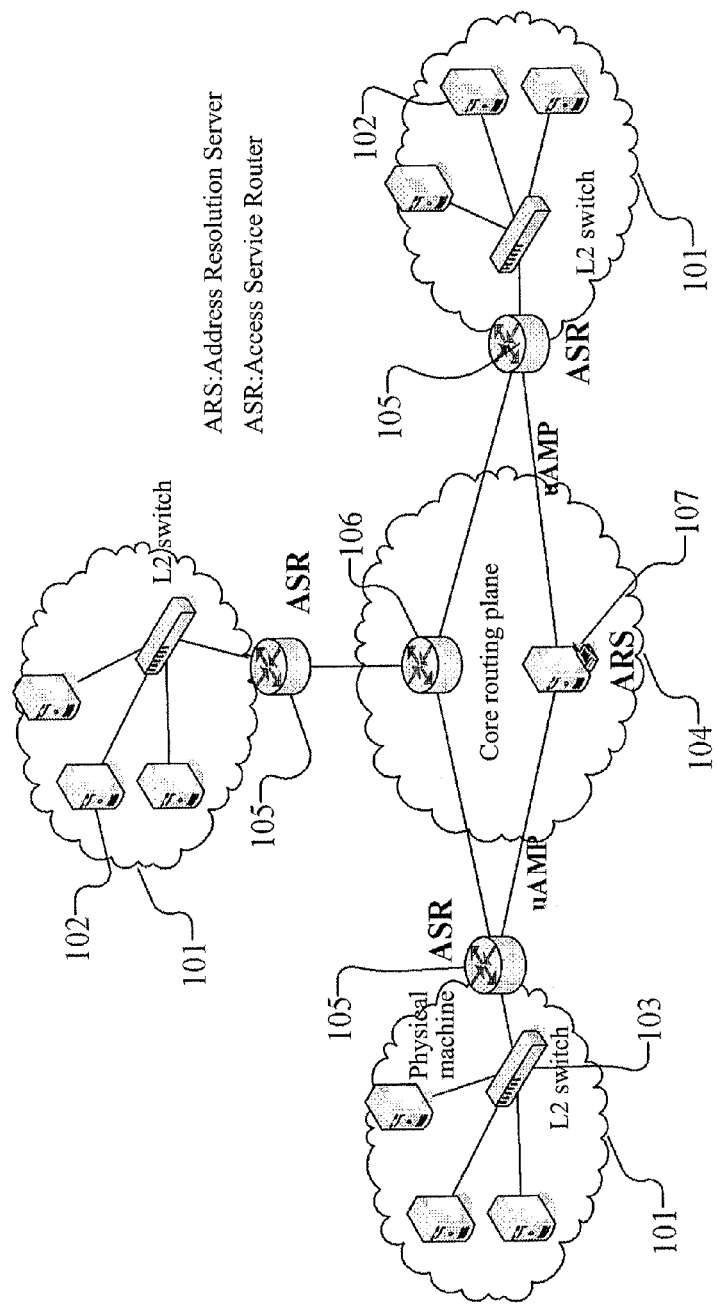
FIG. 1 illustrates a system architecture according to an embodiment of the present document.

Referring to FIG. 1, the system of the above solution comprises a plurality of data centers and an operator network which is responsible for interconnection. The data center is connected with the operator network through an ASR (Access Service Router), and the ASR encapsulates a L2 message across the data centers in an IP message for transmission, thereby constituting a flattened L2 network. Each data center comprises a plurality of physical servers and a L2 switch, each physical server installs with a virtual machine manager which is responsible for managing a plurality of virtual machines on the physical server. An ARS (Address Resolution Server) is responsible for receiving register and query of a L2 address. In the above solution, a virtual switch resides in the virtual machine manager of each physical server of the data center, and the virtual switch has an actual MAC address (which can be called as a real MAC address). All virtual MAC addresses of the virtual machines for external communication are replaced with the real MAC addresses by the virtual switch.

Such a solution has two advantages as follows. 1) For the switching inside the data center, the number of visible MAC addresses is greatly reduced, thereby reducing the size of a MAC forwarding table and decreasing the frequency of MAC learning. 2) The real MAC address is bound to the physical server, the connection relationship between the physical server and the switch is stable, and the forwarding relationship of the real MAC address in the switched network has been pre-established and keeps unchanged, so when communication is performed using the real MAC address, the switched network does not need to perform the MAC address learning again even if the virtual machine migrates, which provides a good basis for the virtual machine migration; however, the virtual machine migration faces with a more complicated problem, and this characteristic only simplifies implementation, but does not completely support virtual machine mobility.

In order to support the virtual machine mobility, the opposite end of the virtual machine for communication must be notified in real time, after the virtual machine migrates, to forward messages according to a new real MAC address.

It is assumed that any virtual machine (a first virtual machine) intends to communicate with another virtual machine (a second virtual machine) in the local area network, and the flow of the virtual machine migration according to the present embodiment comprises the following steps.

In step one, the first virtual machine sends an ARP/NDP broadcasting address query request message for querying a MAC address corresponding to an IP address of the second virtual machine, a virtual switch intercepts the message, converts the message to a ARP/NDP unicast query & subscribe request message and sends to an ASR to instruct it to not only query the MAC address corresponding to the IP address but also request for subscribing to a MAC address change notification.

The ARP/NDP query request sent out by the virtual machine in this step is still in conformity with a common broadcasting query protocol of the existing protocols, and the unicast request triggered by the virtual switch after receiving the query request includes two type of semanteme, namely query and subscription.

In step two, after receiving the above request, the ASR converts it to a mapping query request MAP_Request between the ASR and an ARS, and instructs the ARS to return the MAC address corresponding to the IP address and subscribe to the MAC address change notification.

In step three, the ARS records a subscription relationship of the virtual switch for the IP address, searches a database to obtain the MAC address currently registered by the IP address, and returns the MAC address to the ASR through a response message.

In step four, the ASR converts the response to an ARP unicast response and sends it to the virtual switch to which the first virtual machine belongs, and the virtual switch converts the ARP unicast response to a reponse to the ARP/NDP broadcasting query request, wherein the format of this response conforms to the existing ARP/NDP protocol.

In step five, the second virtual machine migrates under the control of a virtual machine manager; and after migration, a virtual machine manager of a physical server to which the second virtual machine migrates informs a corresponding virtual switch (the virtual switch to which the second virtual machine migrates), and this virtual switch initiates a new address registering request to notify the ARS that the MAC address corresponding to the IP address of the second virtual machine has been changed to a real MAC address corresponding to the local virtual switch.

In step six, after receiving the new address registering request, the ARS checks subscription record of MAC address change for the IP address which exists in the database, finds the subscription relationship of the virtual switch where the first virtual machine is located for the IP address, sends a MAC address change notification message to the virtual switch where the first virtual machine is located, and the virtual switch where the first virtual machine is located records a corresponding relationship between the IP address of the second virtual machine and the new MAC address.

In step seven, the first virtual machine still sends an IP message to the second virtual machine after the second virtual machine migrates, and since the first virtual machine cannot perceive the migration of the second virtual machine, the destination MAC address of the message is still the MAC address of the second virtual machine before migration; the virtual switch intercepts the message, replaces the destination MAC address of the message with the new MAC address obtained from the address change notification message; and the message is correctly sent to the virtual switch where the second virtual machine after migration is located, and is further forwarded to the second virtual machine.

In the step five, when the second virtual machine migrates, and if the physical server to which the second virtual machine migrates is not in the same data center with the original physical server, the communication needs to pass through two interconnected ASR routing nodes. In this case, in the step six, when the MAC address change notification message passes through the ASR where the first virtual machine is located, the ASR changes the MAC address of the second virtual machine to the MAC address of the present ASR, and meanwhile records the real MAC address of the second virtual machine and the IP address of the ASR to which the second virtual machine belongs; so that, in the step seven, when the message sent out by the first virtual machine passes through the ASR where the first virtual machine is located, the ASR can search the records to recover the new real MAC address of the second virtual machine, and encapsulates it in an IP tunnel message, wherein the destination address of the tunnel is the address of the ASR where the second virtual machine is located after migration. After receiving the message, the ASR where the second virtual machine is located after migration removes the tunnel encapsulation, and sends the message to the second virtual machine which has migrated via the virtual switch.

In the step one, if the virtual switch where the first virtual machine is located has cached the new MAC address of the second virtual machine and has established the subscription relationship, it will directly respond to the broadcasting MAC request of the first virtual machine so as to reduce the number of address query messages sent to the ASR/ARS.

The above flow of the virtual machine migration will be described in detail below.

Figure 2:
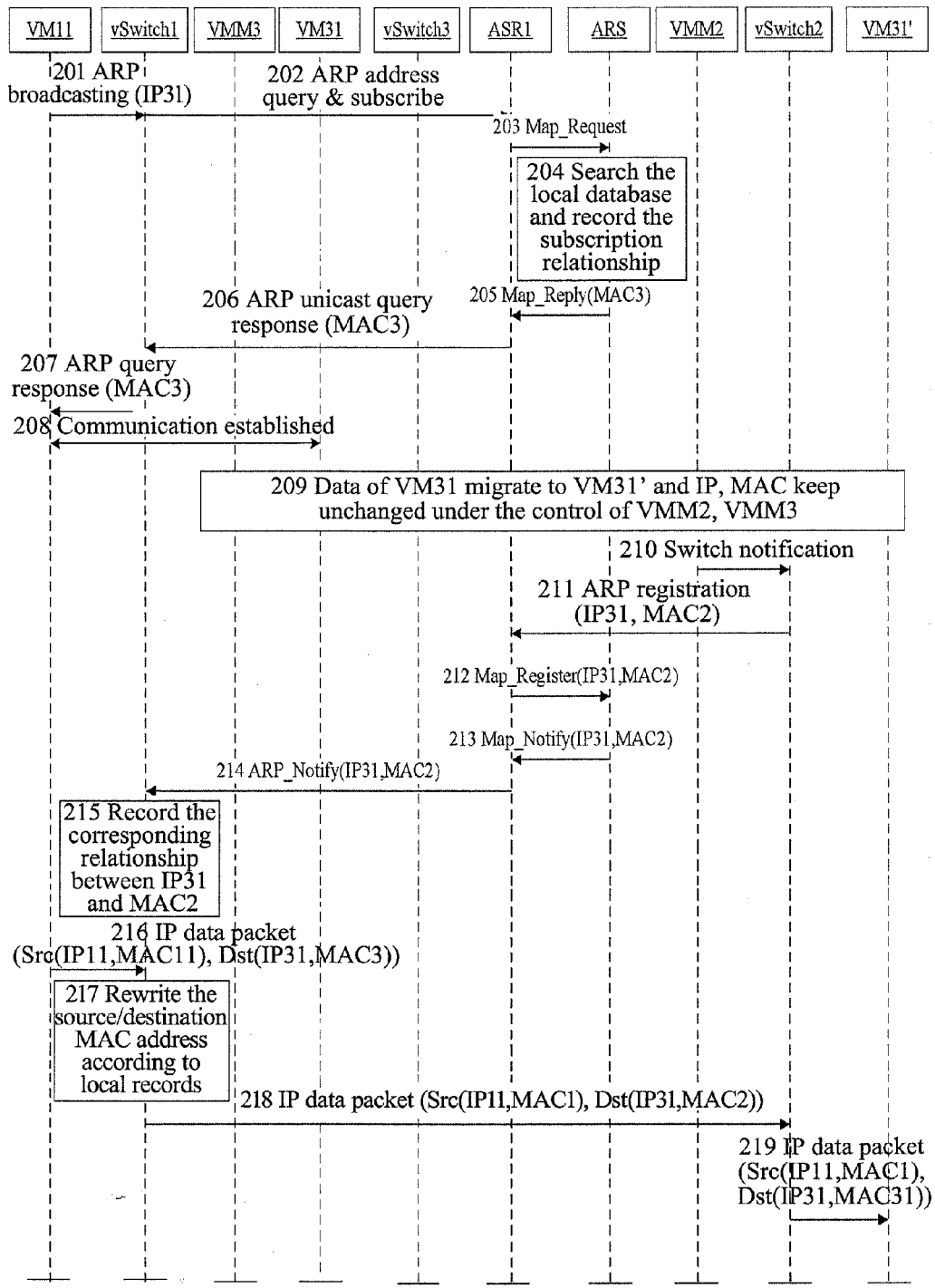
FIG. 2 is a flowchart of a virtual machine migration implemented within the same data center according to an embodiment of the present document.

FIG. 2 shows an example of implementing the virtual machine migration within the same data center according to the present embodiment. The virtual machines in the figure all belong to the same data center and all belong to the same ASR to perform connection. VM11 and vSwitch1 belong to a same physical server, vSwitch1 has a real MAC address MAC1; VM31 and vSwitch3 belong to a same physical server, and under the management of VMM3, vSwitch3 has a real MAC address MAC3; vSwitch2 and VM31' belong to a same physical server, VM31' is under the management of VMM2, and vSwitch2 has a real MAC address MAC2.

The example includes the following flow.

In step 201, the virtual machine VM11 intends to communicate with the VM31, obtains an IP address IP31 of the VM31 in other ways such as a DNS (Domain Name System), and determines that the IP31 belongs to a same sub-network with the VM11 itself; but there is no MAC address of the IP31 locally, so the VM11 initiates an ARP/NDP broadcasting query request message to request for the MAC address of the IP31;

the ARP/NDP query request sent out by the virtual machine in this step still conforms to a common broadcasting query protocol of the existing protocols, and after the virtual switch receives this ARP/NDP query request, a unicast request triggered by the virtual switch includes two type of semanteme, namely query and subscription.

In step 202, the vSwitch1 intercepts the broadcasting query request message, generates a unicast ARP address query & subscribe request, and sends this request to the belonged ASR1 node to instruct to query the MAC address of the IP31 and subscribe to a MAC address change notification.

In step 203, after receiving the request, the ASR1 sends a Map_Register request to an ARS to instruct to query the MAC address of the IP31 and subscribe to the MAC address change notification of the IP31.

In step 204, the ARS queries a local database to obtain the MAC address of the IP31, and records a relationship of the vSwitch1's subscription for the address change of the IP31.

In step 205, the ARS notifies the ASR1, through a Map_Reply message, of the requested MAC address corresponding to the IP31.

In step 206, after receiving the Map_Reply message, the ASR1 sends an ARP unicast address response message to the vSwitch1 to notify the vSwitch1 of the MAC address corresponding to the IP31.

In step 207, according to the received response, the vSwitch1 constructs a response message conforming to the existing ARP/NDP protocol and sends this response message to the VM11 to notify the VM11 of the MAC address corresponding to the IP31.

In step 208, the VM11 establishes communication with the VM31 according to the obtained MAC address.

In step 209, the VM31 interacts with the VMM2 under the control of the VMM3, migrates data and programs to the VM31', and keeps the IP and MAC addresses to be still the IP31 and MAC31.

In step 210, the VMM2 notifies the vSwitch2 to switch.

In step 211, the vSwitch2 sends a unicast ARP registering request, and registers a new corresponding relationship between the IP31 and the real MAC address, MAC2, of the vSwitch2.

In step 212, the above request reaches the ASR1, the ASR1 converts the request to a Map_Register request, and registers the new corresponding relationship between the IP31 and the MAC2 to the ARS.

In step 213, the ARS records the new corresponding relationship between the IP31 and the MAC2, and searches the local database to obtain that the vSwitch1 subscribes to the MAC address change notification for the IP31, and then sends a Map_Notify message to the ASR1.

In step 214, the ASR1 generates an ARP_Notify according to the received Map_Notify message to notify the vSwitch1 that the MAC address corresponding to the IP31 has been changed to the MAC2.

In step 215, the vSwitch1 records the corresponding relationship between the IP31 and the MAC2.

In step 216, the VM11 sends out an IP message after the VM31 migrates, and since it cannot perceive the migration of the VM31 and its local MAC buffer still exists, the destination MAC address of the message sent out is still the MAC3.

In step 217, after intercepting the message, the vSwitch1 rewrites the destination MAC address and changes it to the MAC2 according to the corresponding relationship between the IP31 and the MAC2 recorded in the step 215; and the vSwitch1 also modifies the source MAC to its own real MAC address, MAC1, according to the related art.

In step 218, the vSwitch1 sends out the modified message, and since no new MAC record is added, the message can smoothly arrive at the vSwitch2 through the L2 switched network.

In step 219, after receiving the message, the vSwitch2 replaces the destination MAC address with the MAC31, and sends it to the operation system in the virtual machine VM31', and the communication flow is completed.

Figure 3:
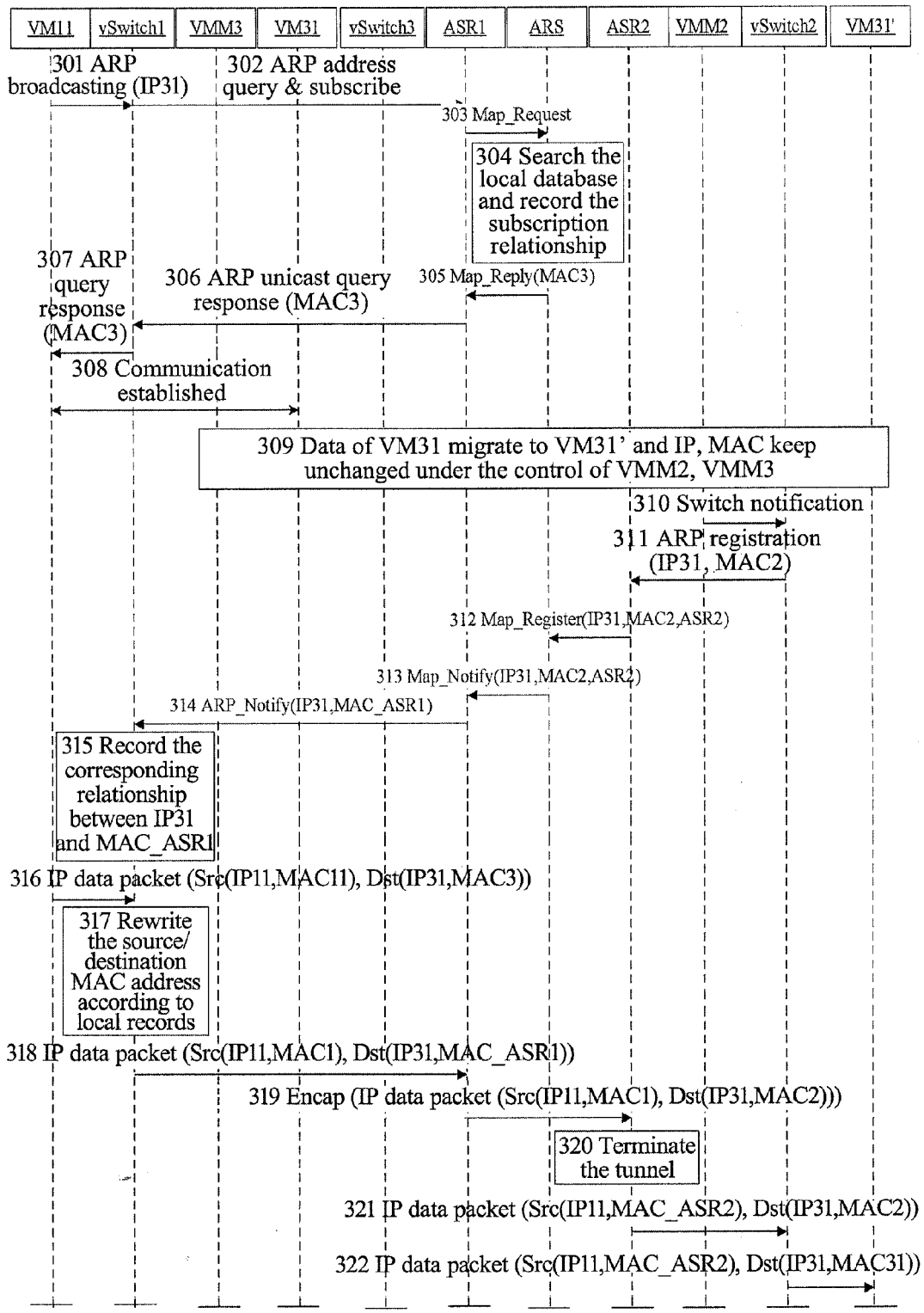
FIG. 3 is a flowchart of a virtual machine migration implemented across two data centers according to an embodiment of the present document.

FIG. 3 shows an example of migration of two virtual machines across data centers. In the figure, physical servers 1, 3 both belong to a data center 1, and a physical server 2 belongs to a data center 2, and both of them belong to ASR1 and ASR2 respectively; VM11 and vSwitch1 belong to the same physical server, the vSwitch1 has a real MAC address MAC1; VM31 and vSwitch3 belong to the same physical server, and under the management of VMM3, the vSwitch3 has a real MAC address MAC3; vSwitch2 and VMM31' belong to the same physical server, and under the management of VMM2, the vSwitch2 has a real MAC address MAC2.

The example includes the following flow:

Steps 301-308, the same with steps 201-208 in the above Example 1, are the processes of the virtual machine VM11 querying the MAC address of the VM31 and establishing communication.

Steps 309-313, the same with steps 209-213 in the above Example 1, are the processes of the VM31 migrating to the VM31' and the vSwitch2 initiating register of a new address corresponding relationship, and the ARS sends to the vSwitch1 a MAC address change notification of the IP31 subscribed by the vSwitch1, wherein the updated MAC address and the address of the ASR to which the second virtual machine currently belongs are firstly notified to the ASR1.

In step 314, the ASR1 generates an ARP_Notify according to the received Map_Notify message, and notifies the vSwitch1 that the MAC address corresponding to the IP31 has been changed. Herein, in order to ensure that the inter-site communication passes through the ASR1, the MAC address corresponding to the IP31 in the ARP_Notify is modified to the MAC address of the ASR1, MAC_ASR1.

In step 315, the vSwitch1 records a corresponding relationship between the IP31 and the MAC_ASR1.

In step 316, the VM11 sends out an IP message after the VM31 migrates, and since it cannot perceive the migration of the VM31 and its local MAC buffer still exists, the destination MAC address of the message sent out by the VM11 is still the MAC3.

In step 317, after intercepting the message, the vSwitch1 rewrites the destination MAC address and changes it to the MAC_ASR1 according to the corresponding relationship between the IP31 and the MAC_ASR1 recorded in step 315, and modifies the source MAC address to its own real MAC address, MAC2, according to the related art;

In step 318, the vSwitch1 sends out the modified message, and since the destination address of this message is the MAC address of the ASR1, the message arrives at the ASR1.

In step 319, after receiving the above message, the ASR1 searches the local database and acquires that the real MAC address corresponding to the IP31 is the MAC2 which belongs to the ASR2, then the ASR1 changes the destination MAC address of the received message to the MAC2 and encapsulates it in a tunnel; where, the address of the header of the tunnel is the address of the ASR2. This tunnel can utilize any existing tunnel encapsulation technology, for example, IP in IP, GRE (Generic Routing Encapsulation) tunnel or MPLS (Multi-Protocol Label Switching) tunnel, etc.

In step 320, after receiving the above message, the ASR2 de-encapsulates the tunnel to take out the original message.

In step 321, the ASR2 modifies the source MAC address of the de-encapsulated message to its own MAC address, MAC_ASR2, so that subsequent messages can be forwarded via the ASR2 itself, and then the ASR2 sends the message to the vSwitch2 according to the destination MAC address, MAC2.

In step 322, the vSwitch2 searches the local records and modifies the destination MAC address to a virtual MAC address of the VM31', MAC31, and sends the message to the operation system of the VM31'.

Please refer to FIG. 1 again, an implement system for realizing virtual machine mobility according to the present embodiment, comprising: an operator network and a data center, a physical server of the data center installs with a virtual machine, the operator network is provided with an address resolution server (ARS), and the physical sever is further provided with a virtual switch, wherein:

the virtual switch is configured to: in a process of the virtual machine establishing communication with the opposite end for communication, subscribe to a media access control (MAC) address change notification of the opposite end for communication from the ARS; and meanwhile, when a virtual machine migrates into the physical server where the virtual switch is located, register to the ARS a corresponding relationship between an IP address of the virtual machine that has migrated into and a MAC address of the virtual switch itself.

The virtual switch is configured to subscribe to the MAC address change notification of the opposite end for communication from the ARS in the following way: receiving an broadcasting query request sent by the virtual machine, convert the broadcasting query request to a unicast query & subscribe request, and use the unicast query & subscribe request to query the MAC address corresponding to the IP address of the opposite end for communication from the ARS and subscribe to the MAC address change notification of the opposite end for communication.

The virtual switch is further configured to: after receiving a message of the virtual machine, modify a destination MAC address of the message to the received updated MAC address of the opposite end for communication of the virtual machine, and send the message to a virtual switch on a physical server where the opposite end for communication of the virtual machine is located through a layer-2 switch.

The ARS is configured to: update the MAC address corresponding to the IP address of the migrating virtual machine, and notify the subscribing virtual machine of the updated MAC address of the migrating virtual machine according to the subscription of the virtual machine.

When the ARS notifies the subscribing virtual machine of the updated MAC address of the migrating virtual machine, the updated MAC address is firstly notified to an access service router (ASR) to which the subscribing virtual machine belongs.

When the ARS notifies the subscribing virtual switch of the updated MAC address of the migrating virtual machine, it further notifies the subscribing virtual machine of an address of an ASR to which the migrating virtual machine belongs, wherein the notification message firstly arrives at the ASR to which the subscribing virtual machine belongs.

The data center further comprises an ASR; the ARS is configured to:

when the updated MAC address is an address of a virtual switch under the ASR, notify the virtual switch on the physical server where the subscribing virtual machine is located of the updated MAC address; or when the updated MAC address is not an address of a virtual switch under the ASR, store the updated MAC address of the opposite end for communication of the virtual machine and an address of an ASR to which the opposite end for communication belongs, and notify the virtual switch on the physical server where the virtual machine is located of its own address.

The virtual machine is configured to send a message to the opposite end for communication. After receiving the message, the virtual switch modifies a destination MAC address of the message to the received address of the ASR.

The ASR, after receiving the message, modifies the destination MAC address of the message to the updated MAC address of the opposite end for communication, encapsulates the message in a tunnel, wherein an address of a header of the tunnel is the address of the ASR to which the opposite end for communication of the virtual machine belongs, thereby sending the message to the ASR to which the opposite end for communication of the virtual machine belongs.

The present disclosure further provides a physical server, which is provided with the above virtual machine and the virtual switch.

In other embodiments, the virtual switch may also be implemented in separate hardware configuration or serve as enhancement of the ability of the existing L2 switch. The separate hardware switch or the existing enhanced L2 switch is located at the first hop position of the access network of the virtual machine.

A person having ordinary skill in the art can understand that all or part of the steps of the above method may be implemented by a program instructing related hardware, and the program can be stored in a computer-readable medium, such as a read-only memory, a magnetic disk or an optical disk. Optionally, all or part of the steps of the above embodiments can also be implemented by using one or more integrated circuits. Correspondingly, each module in the above embodiments may be implemented in the form of hardware, or in the form of software functional modules. The present document is not limited to any particular form of combination of hardware and software.

Of course, the present document may have a plurality of embodiments, and a person having ordinary skill in the art can make various corresponding modifications and changes according to the present document without departing from the spirit and essence of the present document; and, any modification, equivalent and improvement which are made within the spirit and essence of the present document shall all fall into the protection scope of the present document.

INDUSTRIAL APPLICABILITY

Compared with the related art, the present document can support virtual machine mobility in an extended L2 network without interrupted connection of upper-layer applications, thereby greatly improving the practicability of virtual machine migration.

What is claimed is:

1. A method for realizing virtual machine mobility comprising:
   in a process of establishing communication with a second virtual machine, a first virtual machine subscribing to a media access control (MAC) address change notification of the second virtual machine from an address resolution server (ARS) through a first virtual switch in a physical server where the first virtual machine is located;
   after the second virtual machine migrates, a second virtual switch in a physical server, to which the second virtual machine migrates, registering to the ARS a corresponding relationship between an IP address of the second virtual machine and a MAC address of the second virtual switch; and
   the ARS updating the MAC address corresponding to the IP address of the second virtual machine, and notifying the first virtual machine of the updated MAC address according to the subscription of the first virtual machine;
   wherein the step of subscribing to the MAC address change notification of the second virtual machine from the ARS comprises,
   the first virtual machine querying the MAC address corresponding to the IP address of the second virtual machine from the ARS and subscribing to the MAC address change notification of the second virtual machine by adopting a request message,
   wherein the first virtual machine sends an address query broadcasting query request, the first virtual switch intercepts the address query broadcasting query request, converts the address query broadcasting query request to a unicast query and subscribe request, uses the unicast query and subscribe request to query the MAC address corresponding to the IP address of the second virtual machine from the ARS, and subscribes to the MAC address change notification of the second virtual machine.

2. The method according to claim 1 wherein the step of notifying the first virtual machine of the updated MAC address comprises:
   after updating the MAC address corresponding to the IP address of the second virtual machine, the ARS sending a notification message containing the updated MAC address, and the notification message firstly arriving at an access service router (ASR) to which the first virtual machine belongs; and
   if the updated MAC address is an address of the virtual switch under the ASR, the ASR notifying the first virtual switch of the updated MAC address.

3. The method according to claim 2 further comprising:
   after subscribing to the MAC address change notification of the second virtual machine, the first virtual machine sending a message to the second virtual machine through the first virtual switch; and
   after receiving the message, the first virtual switch modifying a destination MAC address of the message to the received updated MAC address of the second virtual machine, and sending the message to the second virtual switch through a layer-2 switch.

4. The method according to claim 1 wherein the step of notifying the first virtual machine of the updated MAC address comprises:
   after updating the MAC address corresponding to the IP address of the second virtual machine, the ARS sending a notification message containing the updated MAC address and an address of an ASR to which the second virtual machine belongs, and the notification message firstly arriving at an ASR to which the first virtual machine belongs; and
   if the updated MAC address is not an address of a virtual switch under the ASR to which the first virtual machine belongs, the ASR to which the first virtual machine belongs storing the updated MAC address and the address of the ASR to which the second virtual machine belongs, and notifying the first virtual switch of an address of the ASR itself to which the first virtual machine belongs.

5. The method according to claim 4 further comprising:
   after subscribing to the MAC address change notification of the second virtual machine, the first virtual machine sending a message to the second virtual machine through the first virtual switch; and
   after receiving the message, the first virtual switch modifying a destination MAC address to the received address of the ASR to which the first virtual machine belongs, and sending the message to the ASR to which the first virtual machine belongs; and
   after receiving the message, the ASR to which the first virtual machine belongs modifying the destination MAC address to the updated MAC address of the second virtual machine, encapsulating the message in a tunnel and sending to the ASR to which the second virtual machine belongs, wherein an address of a header of the tunnel is the address of the ASR to which the second virtual machine belongs.

6. The method according to claim 5 further comprising:
   after receiving the message, the ASR to which the second virtual machine belongs removing the tunnel, modifying a source MAC address of the message to a MAC address of the ASR itself to which the second virtual machine belongs, and sending the message to the second virtual switch according to the destination MAC address, the second virtual switch querying the MAC address of the second virtual machine according to the destination IP address in the message, modifying the destination MAC address of the message to the MAC address of the second virtual machine, and sending the message to the second virtual machine.

7. A system for realizing virtual machine mobility comprising: an operator network and a data center, wherein, a physical server in the data center installs with a virtual machine, the operator network is provided with an address resolution server (ARS), and the physical sever is further provided with a virtual switch, and wherein:
   the virtual machine is configured to: in a process of establishing communication with an opposite end for communication, subscribe to a media access control (MAC) address change notification of the opposite end for communication from the ARS through the virtual switch;

the virtual switch is configured to, in the process of the virtual machine establishing the communication with the opposite end for communication, subscribe to the MAC address change notification of the opposite end for communication from the ARS, and when a virtual machine migrates into the physical server, register to the ARS a corresponding relationship between an IP address of the virtual machine that has migrated into and a MAC address of the virtual switch itself; and the ARS is configured to, when a virtual machine migrates, update a MAC address corresponding to an IP address of the virtual machine that has migrated, and notify the virtual machine subscribing to the MAC address change notification of the virtual machine that has migrated of the updated MAC address, and wherein, the virtual switch is configured to subscribe to the MAC address change notification of the opposite end for communication from the ARS by receiving an address query broadcasting query request sent by the virtual machine, converting the address query broadcasting query request to a unicast query and subscribe request, using the unicast query and subscribe request to query the MAC address corresponding to the IP address of the opposite end for communication from the ARS, and subscribing to the MAC address change notification of the opposite end for communication.

8. The system according to claim 7 wherein the data center further comprises an access service router (ASR); and wherein the ARS is configured to notify the updated MAC address by sending a notification message containing the updated MAC address to the virtual machine subscribing to the MAC address change notification, and the notification message firstly arriving at the ASR to which the virtual machine subscribing to the MAC address change notification belongs; and wherein the ASR is configured to, after receiving the updated MAC address of the opposite end for communication, if the updated MAC address of the opposite end for communication is an address of the virtual machine under this ASR, notify the virtual switch on the physical server of the updated MAC address.

9. The system according to claim 8 wherein the virtual machine is further configured to send a message to the opposite end for communication through the virtual switch; and the virtual switch is further configured to: after receiving the message, modify a destination MAC address of the message to the received updated MAC address of the opposite end for communication, and send the message to the virtual switch on the physical server where the opposite end for communication is located through a layer-2 switch.

10. The system according to claim 7 wherein the data center further comprises an ASR, and wherein the ARS is configured to notify the updated MAC address in the following way: sending a notification message containing the updated MAC address and an address of an ASR to which the virtual machine that has migrated belongs to the virtual machine subscribing to the MAC address change notification, and the notification message firstly arriving at an ASR to which the virtual machine subscribing to the MAC address change notification belongs; and the ASR is configured to: after receiving the updated MAC address of the opposite end for communication and the address of the ASR to which the opposite end for communication belongs, if the updated MAC address of the opposite end for communication is not the address of the virtual switch under this ASR, store the updated MAC address of the opposite end for communication and the address of the ASR to which the opposite end for communication belongs, and notify the virtual switch on the physical server of an address of this ASR itself.

11. The system according to claim 10 wherein, the virtual machine is further configured to send a message to the opposite end for communication through the virtual switch;

the virtual switch is further configured to: after receiving the message, modify a destination MAC address to the received address of the ASR, and send the message to the ASR; and the ASR is further configured to: after receiving the message, modify the destination MAC address to the updated MAC address of the opposite end for communication, encapsulate the message in a tunnel and send to the ASR to which the opposite end for communication belongs, wherein an address of a header of the tunnel is an address of the ASR to which the opposite end for communication belongs.

12. A physical server provided with a hardware processor, which hardware processor implements a virtual switch and a virtual machine, wherein, the virtual machine is configured to: in a process of establishing communication with an opposite end for communication, subscribe to a media access control (MAC) address change notification of the opposite end for communication from an address resolution server (ARS) through the virtual switch;

the virtual switch is configured to: in the process of the virtual machine establishing the communication with the opposite end for communication, subscribe to the MAC address change notification of the opposite end for communication from the ARS; and when a new virtual machine migrates into the physical server, register to the ARS a corresponding relationship between an IP address of the virtual machine that has migrated into and a MAC address of the virtual switch itself; and the virtual switch is configured to subscribe to the MAC address change notification of the opposite end for communication in the following way: receiving an address query broadcasting query request sent by the virtual machine, convert the address query broadcasting query request to a unicast query and subscribe request, and use the unicast query and subscribe request to query a MAC address corresponding to an IP address of the opposite end for communication from the ARS and subscribe to the MAC address change notification of the opposite end for communication.

13. The physical server according to claim 12 wherein, the virtual machine is further configured to send a message to the opposite end for communication through the virtual switch;

the virtual switch is further configured to: after receiving the message, modify a destination MAC address to the updated MAC address of the opposite end for communication, and send the message to a virtual switch on a physical server where the opposite end for communication is located through a layer-2 switch, or after receiving the message, modify a destination MAC address to an address of an access service router (ASR) to which the virtual switch itself belongs, and send the message to an ASR to which the opposite end for communication belongs through the ASR to which the virtual switch itself belongs.

* * * * *